United States Patent [19]

Nakamura

[11] Patent Number: 4,649,342

[45] Date of Patent: Mar. 10, 1987

[54] APPARATUS USING INCLINED SENSOR FOR DETECTING RELATIVE DISPLACEMENT

[76] Inventor: Shigekazu Nakamura, 1-32-402, Nishiageo-Daiichi-Danchi, 845-1, Ohaza-Koshikiya, Ageo City, Saitama Pref., Japan

[21] Appl. No.: 619,135

[22] Filed: Jun. 11, 1984

[30] Foreign Application Priority Data

Jun. 17, 1983 [JP] Japan .................................. 58-107828

[51] Int. Cl.$^4$ ............................................... G01B 7/14
[52] U.S. Cl. .................................... 324/208; 324/252; 324/260; 338/32 R
[58] Field of Search ............... 324/207, 208, 252, 228, 324/174, 173; 338/32 R, 32 H

[56] References Cited

U.S. PATENT DOCUMENTS

| | | | |
|---|---|---|---|
| 4,053,829 | 10/1977 | Maruo | 338/32 R X |
| 4,255,708 | 3/1981 | Wilson, III | 324/208 |
| 4,274,053 | 6/1981 | Ito et al. | 324/208 |
| 4,306,215 | 12/1981 | Jeffers | 338/32 R |
| 4,343,026 | 8/1982 | Griffith et al. | 338/32 R X |
| 4,361,805 | 11/1982 | Narimatsu et al. | 324/207 |
| 4,401,944 | 8/1983 | Narimatsu et al. | 324/207 |
| 4,506,217 | 3/1985 | Rothley et al. | 324/208 |

*Primary Examiner*—Gerard R. Strecker
*Assistant Examiner*—Warren S. Edmonds

[57] ABSTRACT

An apparatus for detecting a relative displacement of a magnetic record medium and a magnetic sensor a method for manufacturing the above apparatus are disclosed. A magnetization pattern is recorded on the magnetic record medium and the relative displacement is detected by means of at least two magnetic detectors arranged on a common substrate with a given pitch. The common substrate is relatively inclined with respect to an arranging direction of the magnetization pattern to derive a desired phase difference between output signals generated from respective two magnetic detectors. The two magnetic detectors are connected into a bridge circuit to derive a detection output signal representing only the relative displacement without being affected by a noise magnetic field.

8 Claims, 19 Drawing Figures

FIG_3

FIG_4

FIG_5

FIG_6

FIG_10

FIG_11

FIG_12

FIG.13

FIG_14

FIG_15

APPARATUS USING INCLINED SENSOR FOR DETECTING RELATIVE DISPLACEMENT

BACKGROUND OF THE INVENTION

This invention relates to an apparatus for detecting a relative displacement of a magnetic sensor comprising at least two magnetoresistive elements (hereinafter abbreviated as MR element) and a magnetic record medium having a magnetization pattern recorded thereon in a direction of displacement. Such an apparatus can be used as a rotary encoder, linear encoder, etc.

Figure 1:
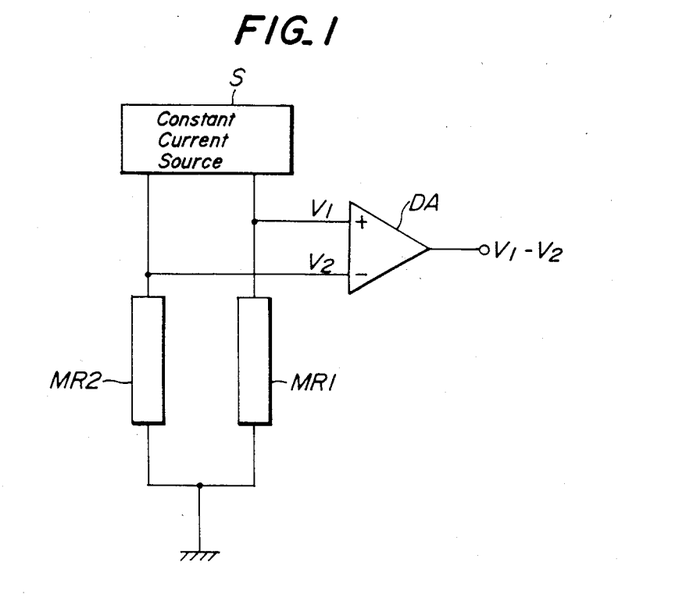
FIG. 1 is a schematic view showing one embodiment of a displacing amount detecting apparatus comprising known magnetoresistive elements.

In the displacement detector comprising a plurality of MR elements, it has been known to effect a magnetic bias for the MR elements. For instance, in Japanese Patent Publication No. 37,204/78, it is proposed to arrange a MR element on respective sides of an insulating layer and to bias magnetically one of the MR elements by a magnetic field produced by a driving current passing through the other MR element and vice versa. Hereinafter this type of magnetic biasing is termed as a primary mutual bias system. In Japanese Patent Publication No. 37,205/78, there is disclosed another biasing method in which a magnetic field generated by a driving current passing through one of the MR elements is applied to the other MR element and one component of the magnetization in the other MR element produces a reverse magnetic field which is applied to the one MR element as a biasing magnetic field. This type of biasing is called a secondary mutual bias system. FIG. 1 shows a circuit diagram of a magnetic detector disclosed in the above mentioned Japanese Patent Publication No. 37,204/78. First and second magnetoresistive elements $MR_1$ and $MR_2$ arranged on respective sides of an insulating layer are connected in parallel with each other between a constant current source S and the earth potential and junction points between the first and second magnetoresistive elements $MR_1$ and $MR_2$ and the constant current source S are connected to inputs of a differential amplifier DA to derive a difference between voltages $V_1$ and $V_2$ at the junction points.

Such a magnetic detector of mutual bias type is formed by applying, on an insulating substrate, the first magnetoresistive element $MR_1$, the insulating layer and the second magnetoresistive element $MR_2$ successively. In order to produce a stable output signal, it is essential that the first and second magnetoresistive elements have the same magnetic characteristics. In a typical process for manufacturing such a magnetic detector, at first a first magnetoresistive film and a conductive film are applied on the substrate and then these films are shaped into a given pattern by means of a photoetching to form the first magnetoresistive element with a given conductor pattern. Next the insulating layer is applied and further a second magnetoresistive film and a second conductive film are successively applied on the insulating layer. Finally, the second magnetoresistive film and second conductive film are shaped into a given pattern by photoetching to form the second magnetoresistive element $MR_2$ with a given conductor pattern. In such a manufacturing process, since the first and second magnetoresistive elements $MR_1$ and $MR_2$ are formed by the different magnetoresistive films, it is rather difficult to make various characteristics such as thickness, specific resistance, resistance-temperature coefficient and configuration coefficient of the first and second magnetoresistive elements equal to each other. Moreover, since the first and second magnetoresistive elements are formed by separate patterning steps, their dimensions are liable to be different from each other. In this manner, in the known magnetic detector, the first and second magnetoresistive elements have different magnetic characteristics and therefore, an unbalanced output voltage might be generated under a zero magnetic field and further the output voltage might drift due to temperature variation.

In case of detecting a rotation angle of a motor by means of the magnetic detector, the magnetic detector is not only exposed in a magnetic field caused by the magnetization pattern, but also exposed in a magnetic field caused by the motor. In this case, since it is difficult to select a signal magnetic field from a noise magnetic field, a signal to noise ratio of the output signal is decreased and detection accuracy becomes bad.

SUMMARY OF THE INVENTION

The present invention has for its object to eliminate the drawbacks mentioned above, and to provide a displacement detecting apparatus which can detect a magnetic field accurately even if characteristics such as thickness, specific resistance, resistance-temperature coefficient are varied.

It is another object of the invention to provide a displacement detecting apparatus which can detect a signal magnetic field without being affected by a noise magnetic field.

According to the invention, in an apparatus for detecting a relative displacement of a magnetic record medium on which a magnetization pattern is recorded along a displacing direction and a magnetic sensor including at least two magnetic detectors for detecting the magnetization pattern, each of the magnetic detectors having at least two magnetoresistive elements arranged one on the other via an insulating layer, the improvement in that said at least two magnetic detectors are provided on a common substrate and are shifted from one another in a direction substantially perpendicular to the displacing direction, said at least two magnetoresistive elements of each magnetic detectors being magnetically biased in opposite directions to each other; said common substrate is inclined with respect to a direction perpendicular to the displacing direction by such an angle that output signals from the magnetic detectors have a mutual phase difference of about 180°; and that said at least two magnetic detectors are connected into a bridge circuit to derive an output signal representing only the magnetic pattern without being influenced by a noise magnetic field.

It is still another object of the invention to provide a method for manufacturing a displacement detecting apparatus which can detect a signal magnetic field effectively.

According to the invention, a method for manufacturing an apparatus for detecting a relative displacement in which a common substrate on which at least two magnetic detectors are arranged is relatively inclined with respect to an arranging direction of a magnetization pattern, comprises steps of, securing fixedly said common substrate with respect to a magnetic record medium on which a magnetization pattern is to be recorded;

recording the magnetization pattern on said magnetic record medium by means of a recording magnetic head rotatably arranged with respect to a direction perpendicular to a displacing direction; and rotating said recording magnetic head so as to derive a desired phase difference between output signals generated from said at least two magnetic detectors.

DESCRIPTION OF THE PREFERRED EMBODIMENTS

Figure 2:
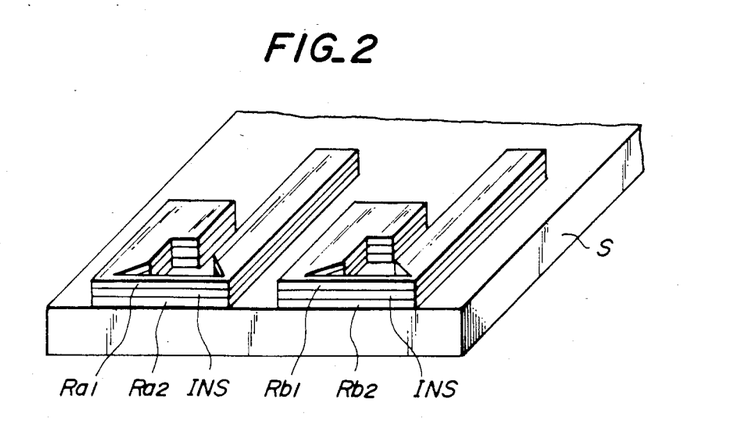
FIG. 2 is a perspective view illustrating one embodiment of a magnetic detector for use in a displacing amount detecting apparatus according to the invention.

FIG. 2 is a perspective view showing one embodiment of magnetic detectors for use in the displacement detecting apparatus according to the invention. For the sake of simplicity, an upper insulating layer is omitted here. In this embodiment, four MR elements $R_{a1}$, $R_{a2}$, $R_{b1}$ and $R_{b2}$ are arranged and the elements $R_{a1}$, $R_{b1}$ and the elements $R_{a2}$, $R_{b2}$ are respectively manufactured by patterning the same MR film. Moreover, the MR elements $R_{a1}$, $R_{a2}$ and the MR elements $R_{b1}$, $R_{b2}$ are arranged on respective sides of insulating layers INS, and these elements are formed on an insulating substrate S.

Figure 3:
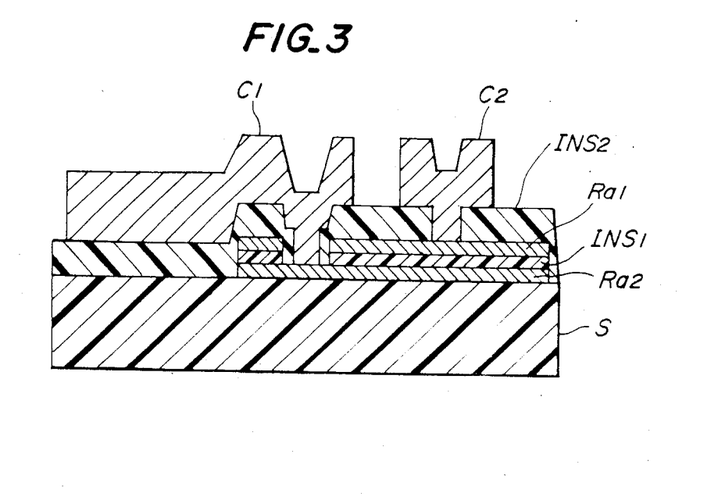
FIG. 3 is a cross sectional view depicting the magnetic detector shown in FIG. 2.

FIG. 3 is a cross sectional view showing one embodiment of a magnetic detector according to the invention. As shown in FIG. 3, a conductive layer $C_1$ is connected to the lower MR element $R_{a2}$ formed on the insulating substrate S via a through-hole pierced in the insulating layers $INS_1$, $INS_2$ and the MR element $R_{a1}$, and a conductive layer $C_2$ is connected to the upper MR element $R_{a1}$ via a through-hole pierced in the insulating layer $INS_2$.

Figure 4:
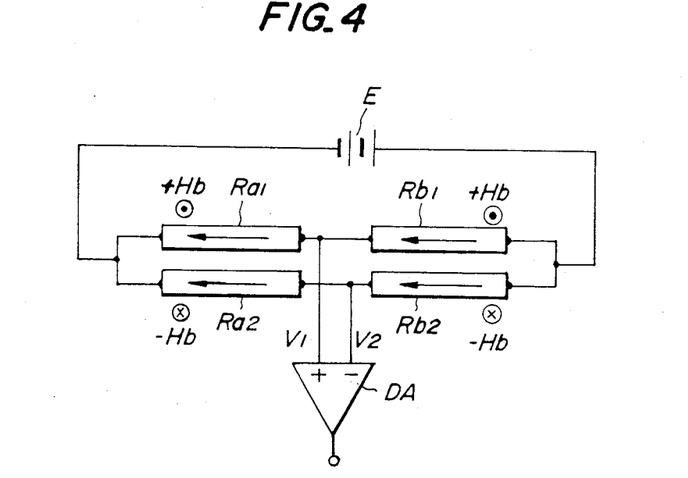
FIG. 4 is a schematic view showing one embodiment of a connection method of the embodiment illustrated in FIG. 2.

As shown in FIG. 4, the MR elements $R_{a1}$, $R_{a2}$, $R_{b1}$ and $R_{b2}$ construct a bridge circuit. That is to say, one ends of the MR elements $R_{b1}$, $R_{b2}$ are commonly connected to a positive terminal of a voltage source E, and the other end of the MR element $R_{b1}$ is connected to one end of the MR element $R_{a1}$. Moreover, the other end of the MR element $R_{b2}$ is connected to one end of the MR element $R_{a2}$, and the other ends of the MR elements $R_{a1}$, $R_{a2}$ are commonly connected to a negative terminal of the voltage source E. Further, a junction point between the MR elements $R_{a1}$ and $R_{b1}$ is connected to a positive input terminal of a differential amplifier DA, and also a junction point between the MR elements $R_{a2}$ and $R_{b2}$ is connected to a negative input terminal of the differential amplifier DA. Therefore, a current respectively flows through the MR elements $R_{a1}$, $R_{a2}$, $R_{b1}$, $R_{b2}$ in a direction shown by an arrow in FIG. 4, and thus these MR elements are mutually biased in a magnetic manner. In this embodiment, since the secondary biasing effect is large, each MR element is magnetically biased as shown in FIG. 4. That is to say, the MR elements $R_{a1}$ and $R_{b1}$ are subjected to a biasing magnetic field $+H_b$ directing upwards with respect to the plane of the drawing, while the MR elements $R_{a2}$ and $R_{b2}$ are subjected to a biasing magnetic field $-H_b$ directing downwards with respect to the plane of the drawing.

Figure 5:
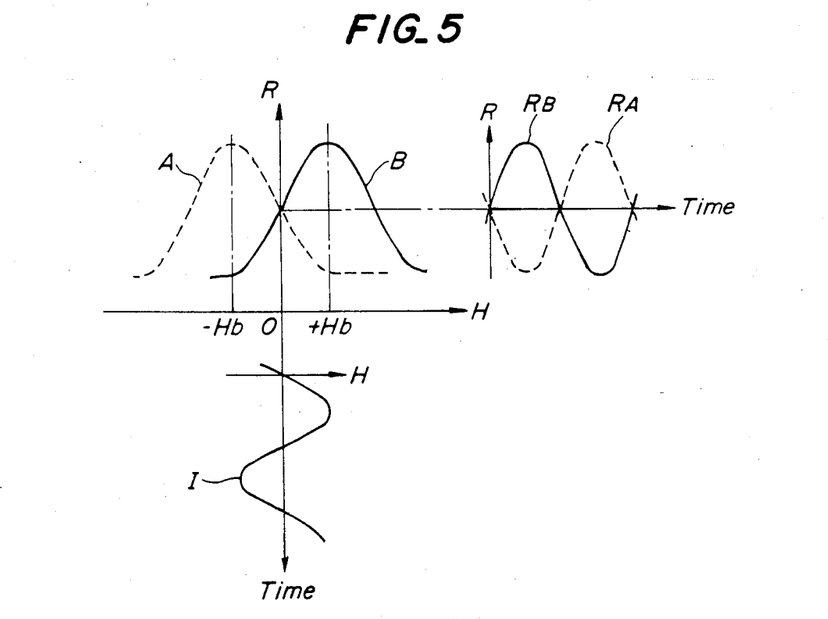
FIG. 5 is a schematic view illustrating one embodiment of an operation characteristic of the embodiment shown in FIG. 2.

Due to the magnetic biasing mentioned above, operating characteristics of the MR elements $R_{a1}$, $R_{b1}$ and $R_{a2}$, $R_{b2}$ become symmetrical as shown in FIG. 5. In FIG. 5, a curve A shows the operating characteristic of the MR elements $R_{a1}$, $R_{b1}$, and thus if an input magnetic field I is applied to the MR elements $R_{a1}$, $R_{b1}$, the resistivity R is varied as shown by a curve $R_A$. In the same manner, a curve B shows the operating characteristic of the MR elements $R_{a2}$, $R_{b2}$, and thus the resistivity R is varied as shown by a curve $R_B$ corresponding to the input magnetic filed I.

Figure 6:
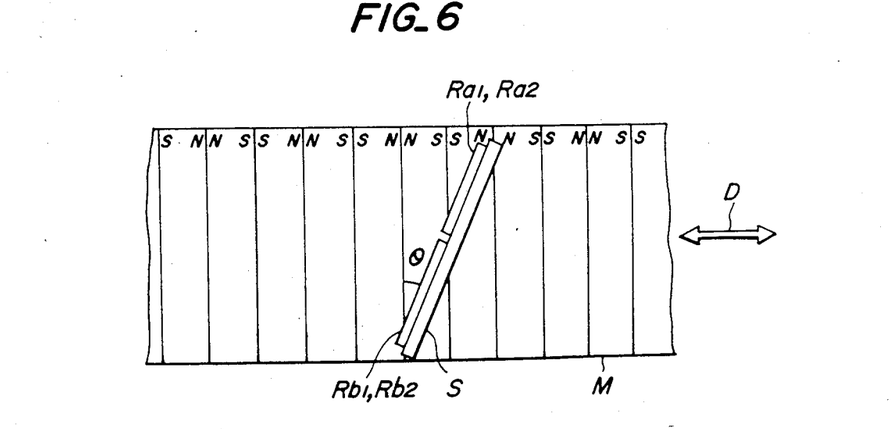
FIG. 6 is a schematic view depicting one embodiment of an arranging relation between a magnetic detector and a magnetization pattern.

According to the invention, the two magnetic detectors are arranged to be inclined as shown in FIG. 6 by an angle $\theta$ with respect to a direction perpendicular to a displacing direction D of a record medium M on which a magnetization pattern is recorded. The inclination angle $\theta$ is so selected that a phase difference between two pairs of MR elements $R_{a1}$, $R_{a2}$ and $R_{b1}$, $R_{b2}$ becomes substantially 180° with respect to a pitch of the magnetization pattern.

In the present embodiment, a direction of magnetic field applied to one pair of MR elements $R_{a1}$, $R_{a2}$ becomes always reverse with respect to that of a magnetic field applied to the other pair of MR elements $R_{b1}$, $R_{b2}$. Contrary to this, a magnetic field caused by a noise is generally applied in the same direction to both pairs of MR elements $R_{a1}$, $R_{a2}$ and $R_{b1}$, $R_{b2}$. Therefore, it is possible to eliminate a noise component due to the noise magnetic field, and thus only a signal component due to the magnetization pattern can be derived from the differential amplifier DA. Moreover, since the selectivity between the signal magnetic field and the noise magnetic field becomes higher, an output signal having high S/N characteristic can be obtained, and thus the detection accuracy of the displacing amount detecting apparatus can be extremely higher.

Now, an unbalanced output of the magnetic detectors will be considered. It is assumed that a specific resistance as a function of temperature T of the first magnetoresistive film constituting the first and second MR elements $R_{a1}$ and $R_{b1}$ is $\rho_1(T)$, a thickness of the first magnetoresistive film is $t_1$, a specific resistance as a function of temperature of a second magnetoresistive film forming the MR elements $R_{a2}$ and $R_{b2}$ is $\rho_2(T)$, a thickness of the second magnetoresistive film is $t_2$, a pattern configuration coefficient (i.e. length/width) of the MR elements $R_{a1}$ and $R_{a2}$ is $k_1$ and a pattern configuration coefficient of the MR elements $R_{b1}$ and $R_{b2}$ is $k_2$. Then, resistance values $R_1$ to $R_4$ of the MR elements $R_{a1}$, $R_{b1}$, $R_{a2}$, $R_{b2}$ may be expressed as follows.

$$R_1 = \rho_1(T) \cdot k_1/t_1$$

$$R_2 = \rho_1(T) \cdot k_2/t_1$$

$$R_3 = \rho_2(T) \cdot k_1/t_2$$

$$R_4 = \rho_2(T) \cdot k_2/t_2$$

Then, the unbalanced output voltage $\Delta V$ under no magnetic field to be detected can be represented by the following equation, wherein $V_s$ is a voltage of the voltage source E.

$$\Delta V = V_1 - V_2$$
$$= V_s \cdot \frac{R_1}{R_1 + R_2} - V_s \cdot \frac{R_3}{R_3 + R_4}$$
$$= V_s \cdot \frac{\rho_1(T) \cdot k_1/t_1}{\rho_1(T) \cdot k_1/t_1 + \rho_1(T) \cdot k_2/t_1} -$$
$$V_s \cdot \frac{\rho_2(T) \cdot k_1/t_2}{\rho_2(T) \cdot k_1/t_2 + \rho_2(T) \cdot k_2/t_2}$$
$$= V_s \left( \frac{k_1}{k_1 + k_2} - \frac{k_1}{k_1 + k_2} \right) = 0$$

From the above equation, it can be concluded that even if $\rho_1(T) \neq \rho_2(T)$, $t_1 \neq t_2$ and $k_1 \neq k_2$, the unbalanced voltage $\Delta V$ becomes always zero and therefore, the detection can be performed precisely without being affected by off-set and temperature-dependent drift.

Figure 7:
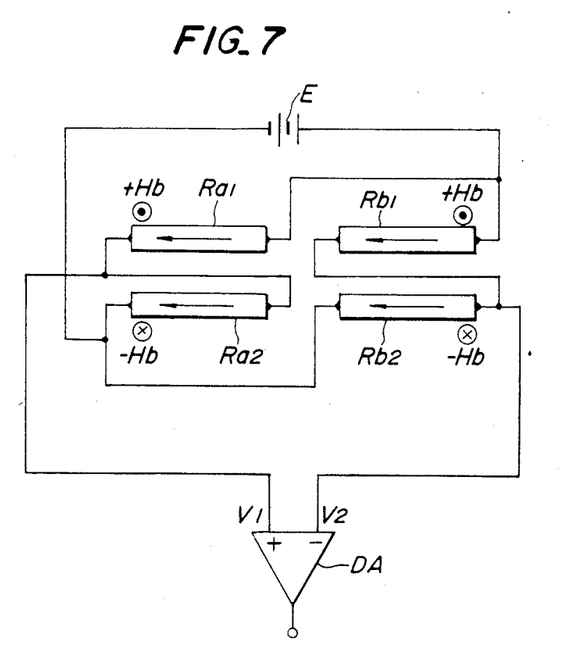
FIG. 7 is a schematic view showing another embodiment of a connection method between the magnetic detectors.

FIG. 7 shows another embodiment of the magnetic detectors for use in the displacement detecting apparatus according to the invention. Also in the present embodiment, two magnetic detectors respectively consisting of the MR elements $R_{a1}$, $R_{a2}$ and $R_{b1}$, $R_{b2}$ are arranged on the same substrate and the substrate is inclined by the angle $\theta$ with respect to the direction perpendicular to the displacing direction of the magnetic pattern. However, the connection method between the MR elements is different from the embodiment mentioned above. That is to say, one ends of the MR elements $R_{a1}$ and $R_{b1}$ are commonly connected to a positive terminal of the voltage source E and the other ends of them are respectively connected to one ends of the MR elements $R_{a2}$ and $R_{b2}$ whose other ends are commonly connected to a negative terminal of the voltage source E. Moreover, a junction point between the MR elements $R_{a1}$ and $R_{a2}$ is connected to a positive input terminal of a differential amplifier DA and also a junction point between the MR elements $R_{b1}$ and $R_{b2}$ is connected to a negative input terminal of the differential amplifier DA. Also in this embodiment, a current flows through each MR element in an arrow direction, and thus each MR element is biased magnetically as shown in FIG. 7 due to the secondary bias effect. Since the secondary magnetic biasing is the same as that shown in FIG. 4, the noise magnetic field is eliminated from the differential output and thus only the output signal due to the magnetization pattern can be derived from the differential amplifier DA. In this case, the unbalanced output voltage $\Delta V$ is expressed as follows.

$$\Delta V = V_s \cdot \left( \frac{R_3}{R_1 + R_3} - \frac{R_4}{R_2 + R_4} \right)$$
$$= V_s \left( \frac{\rho_2(T) \cdot k_1/t_2}{\rho_1(T) \cdot k_1/t_1 + \rho_2(T) \cdot k_1/t_2} - \frac{\rho_2(T) \cdot k_2/t_2}{\rho_1(T) \cdot k_2/t_1 + \rho_2(T) \cdot k_2/t_2} \right) = 0$$

Figure 8:
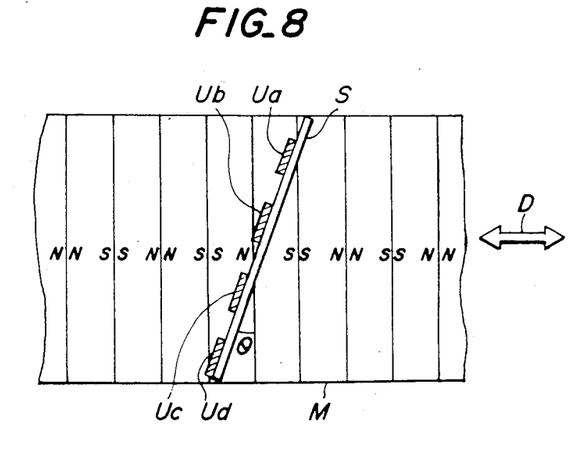
FIG. 8 is a schematic view illustrating another embodiment of the arranging relation between the magnetic detector and the magnetization pattern for use in the displacing amount detecting apparatus according to the invention.

In case of measuring not only the displacing amount but also the displacing direction by the displacement detecting apparatus, it is necessary to use two signals having a phase difference of 90°. FIG. 8 shows one embodiment of the displacement detecting apparatus in which two units each having two pairs of magnetic detectors mentioned above are arranged on the same substrate S and the substrate S is inclined by an angle $\theta$ with respect to a direction perpendicular to a displacing direction D of a record medium M on which the magnetization pattern is recorded. In this embodiment, four magnetic detectors $U_a$ to $U_d$ are arranged on the substrate S, and the magnetic detectors $U_a$ and $U_c$ construct one magnetic unit, while the magnetic detectors $U_b$ and $U_d$ constitute the other magnetic unit. Therefore, the inclination angle $\theta$ is so determined that the phase difference between the magnetic detectors $U_a$ and $U_c$ becomes substantially 180° and also the phase difference between the magnetic detectors $U_b$ and $U_d$ becomes substantially 180°. Since these four magnetic detectors are separated equidistantly from each other, the phase difference of the outputs supplied from the two magnetic detectors becomes 90°.

Figure 9:
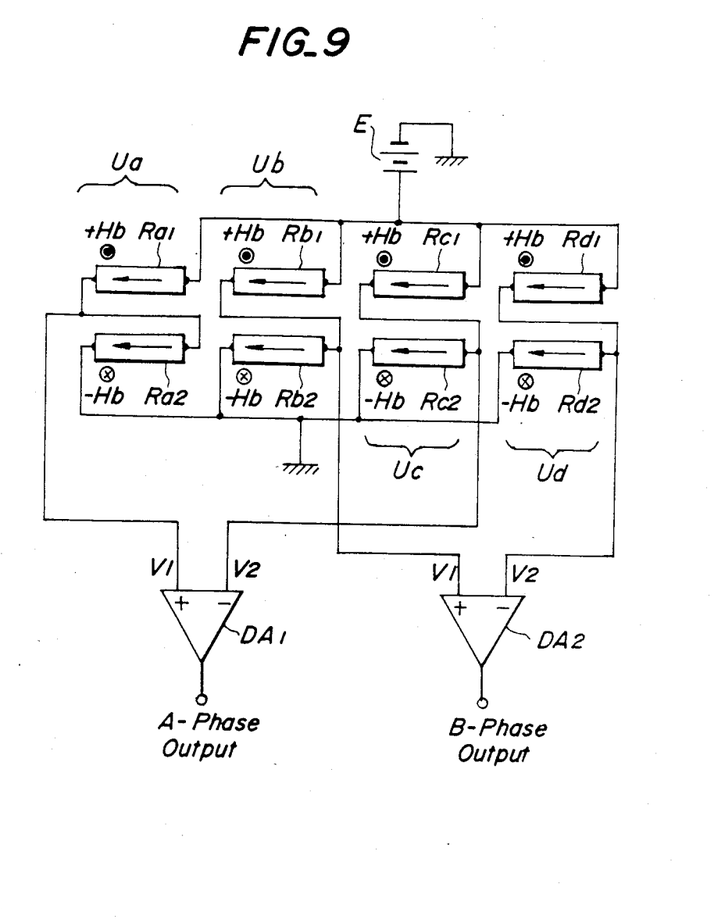
FIG. 9 is a schematic view depicting another embodiment of a connection method between the magnetic detectors for use in the embodiment shown in FIG. 8.

FIG. 9 shows one embodiment of a connection method between MR elements $R_{a1}$, $R_{a2}$; $R_{b1}$, $R_{b2}$; $R_{c1}$, $R_{c2}$; $R_{d1}$, $R_{d2}$ which construct four magnetic detectors $U_a$ to $U_d$. In this embodiment, one ends of first MR elements $R_{a1}$, $R_{b1}$, $R_{c1}$, $R_{d1}$ of each magnetic detector are commonly connected to a positive terminal of a voltage source E, and the other ends of the first MR elements are connected to one ends of second MR elements $R_{a2}$, $R_{b2}$, $R_{c2}$, $R_{d2}$, respectively. Further, the other end of the second MR elements are commonly connected to a negative terminal of the voltage source E. In this manner, a current flows through each MR element in the same direction as shown by the arrow in FIG. 9, so that due to the secondary mutual biasing the MR elements $R_{a1}$, $R_{b1}$, $R_{c1}$, $R_{d1}$ are subjected to a biasing magnetic field $+Hb$ directing upwards with respect to the plane of the drawing and the MR elements $R_{a2}$, $R_{b2}$, $R_{c2}$, $R_{d2}$ are subjected to a biasing magnetic field $-Hb$ directing downwards with respect to the plane of the drawing. Therefore, when the junction point between the MR elements $R_{a1}$ and $R_{a2}$ is connected to a positive input terminal of a first differential amplifier $DA_1$ and the junction point between the MR elements $R_{c1}$ and $R_{c2}$ is connected to a negative terminal of the first differential amplifier $DA_1$, an A-phase output signal representing only the magnetic field caused by the magnetic pattern can be derived from the first differential amplifier $DA_1$ without being affected by the noise magnetic field. In the same manner, when the junction points between the MR elements $R_{b1}$ and $R_{b2}$ and between the MR elements $R_{d1}$ and $R_{d2}$ are respectively connected to the positive and the negative input terminals of a second differential amplifier $DA_2$, and B-phase output signal can be derived from the second differential amplifier $DA_2$ without being affected by the noise magnetic field. In this case, since the phase difference between these A-phase and B-phase output signals becomes 90°, it is possible to detect not only the displacing amount but also the displacing direction. Moreover, since the eight MR elements can be formed by patterning the two magnetoresistive films at same time, the unbalanced output voltages $\Delta V$ are not generated even if the film thickness, the temperature characteristics and the configuration coefficient are varied.

Figure 10:
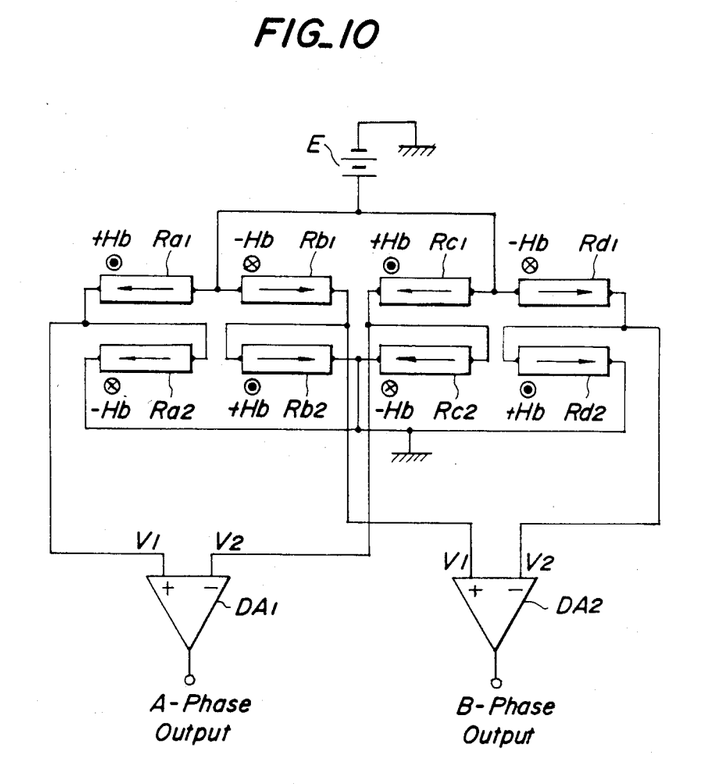
FIG. 10 is a schematic view showing still another embodiment of a connection method between the magnetic detectors.

FIG. 10 shows another embodiment of the displacement detecting apparatus according to the invention, in which only the manner of connecting eight MR elements is different from the embodiment illustrated in FIG. 8. In the present embodiment, a voltage source E and each of the MR elements are connected into bridges as shown in FIG. 10, and a current flows through the MR elements in directions shown by arrows. Therefore, due to the secondary mutual biasing caused by the current, the MR elements are magnetically biased as shown in FIG. 10. In this embodiment, the operation of the displacing amount detecting apparatus is the same as that of the previous embodiment, and thus it is possible to derive the output signals of the A-phase and the B-phase having a phase difference of about 90° due to the magnetization pattern. It should be noted that the output signals are not affected by the noise magnetic field applied to the magnetic sensors in the same phase. Moreover, the unbalanced output voltage $\Delta V$ due to the differences in the thickness, temperature characteristics, and configuration coefficient becomes zero. In this manner, it is possible to effect the accurate displacing amount detection. Further in this embodiment, it is easy to form the conductor patterns of the MR elements on the substrate.

According to the invention, it is necessary to incline the substrate with respect to a direction perpendicular to the displacing direction, and thus this inclination angle will be further discussed here.

Figure 11:
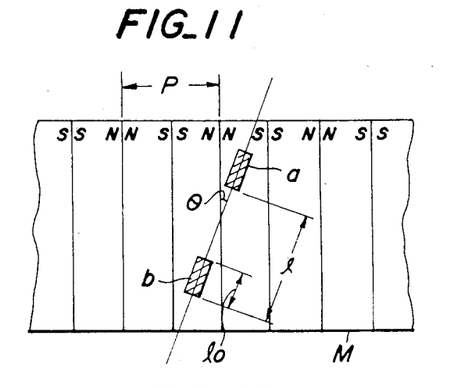
FIG. 11 is a schematic view illustrating still another embodiment of an arranging relation between the magnetic detector and magnetization pattern for explaining a relation between an inclination angle and an output voltage.

FIG. 11 is a schematic view showing positional relations between the magnetization pattern recorded on a record medium M and magnetic detectors a, b. In this embodiment, it is assumed that a pitch between two magnetic detectors a and b is $l$, a length of each magnetic detector is $l_0$, a pitch of the magnetization pattern is P and an inclination angle is $\theta$. Then, a phase difference $\phi$ (radian) between magnetic fields applied to the magnetic detectors a and b can be represented as follows.

$$\phi = \frac{2\pi l}{P} \sin \theta \tag{1}$$

Hereinafter, the explanation will be effected by using the phase difference $\phi$ instead of the inclination angle $\theta$. If it is assumed that an output influence of each magnetic detector caused by inclining the magnetic detector with respect to the magnetization pattern is $f(\phi)$, the output influence $f(\phi)$ is expressed as follows.

$$f(\phi) = \frac{\sin\left(\frac{l_0}{2l} \cdot \phi\right)}{\frac{l_0}{2l} \cdot \phi} \tag{2}$$

Moreover, an influence $g(\phi)$ upon the differential output voltage caused by the phase difference $\phi$ is described as follows.

$$g(\phi) = (V_1 - V_2)_{p-p} = \sin\frac{\phi}{2} \tag{3}$$

Therefore, a relation between the inclination angle and the output voltage is obtained as follows.

$$F = f(\phi) \cdot g(\phi) \tag{4}$$

$$= \frac{\sin\left(\frac{l_0}{2l} \cdot \phi\right)}{\frac{l_0}{2l} \cdot \phi} \cdot \sin\frac{\phi}{2}$$

As shown in FIG. 6, in case of arranging two magnetic detectors very close to each other, it is possible to assume $l = l_0$, and thus the above equation (4) may be further expressed as follows.

$$F = \frac{\sin^2\frac{\phi}{2}}{\frac{\phi}{2}} = \frac{1 - \cos\phi}{\phi} \tag{5}$$

Figure 12:
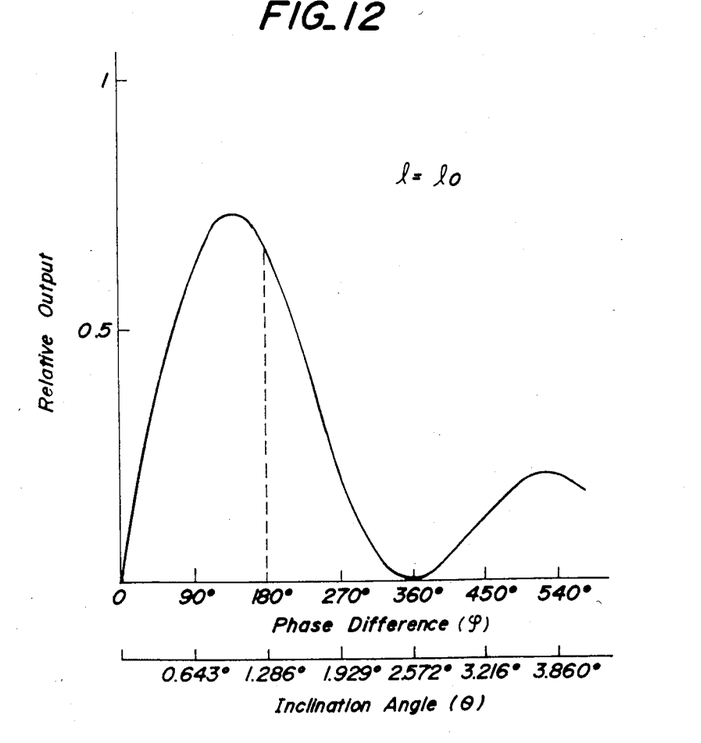
FIGS. 12 and 13 are graphs showing respectively a relation between the inclination angle i.e. a phase difference and the output voltage.

This relation is illustrated in FIG. 12. Moreover, in case of $l = 2l_0$ as shown in FIG. 8, the equation (4) may be further expressed as follows.

$$F = \frac{\sin^2\frac{\phi}{4}}{\frac{\phi}{4}} \cdot \sin\frac{\phi}{2} \tag{6}$$

Figure 13:
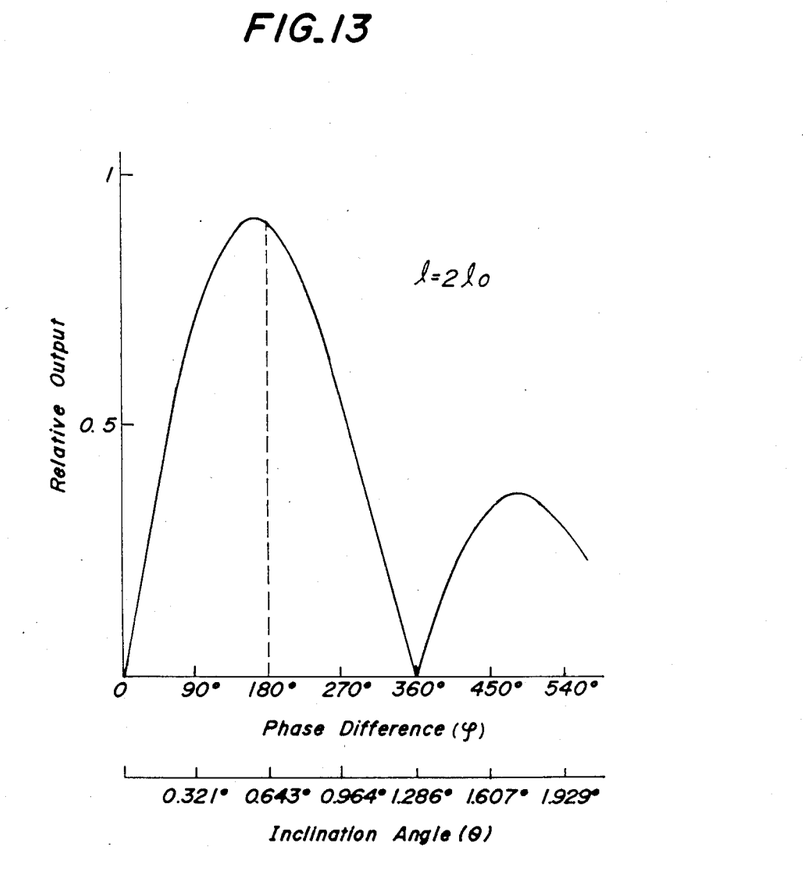

This relation is shown in FIG. 13. In the graphs illustrated in FIGS. 12 and 13, an abscissa shows the phase difference $\phi$ and the corresponding inclination angle $\theta$, and an ordinate shows a relative output. In case that the magnetic detectors are inclined so as to achieve the phase difference $\phi = 180°$, the output of the embodiment shown in FIG. 8 is larger than that of the embodiment illustrated in FIG. 6. Therefore, it is preferable to make the value $l/l_0$ large, but even in the embodiment shown in FIG. 6 it is possible to obtain an output whose magnitude represents about 90 percent of a maximum output value. Moreover, the inclination angle $\theta$ shown in FIGS. 12 and 13 are calculated for a rotary encoder having an MR element whose length $l_0$ is 1.4 mm and a magnetic drum with a diameter of 20 mm along which a thousand magnetization patterns are recorded. In this case, the pitch P of the magnetization pattern is expressed as follows.

$$P = \frac{\pi \times \text{Diameter of magnetic drum }(d)}{\text{Number of patterns }(N)} \quad (7)$$

If the pitch P is substituted for the equation (1), the following equation is obtained.

$$\phi = \frac{2 \cdot N \cdot l}{d} \cdot \sin \theta \quad (8)$$

From the above equation, the inclination angle $\theta$ is described as follows.

$$\theta = \sin^{-1} \frac{d \cdot \phi}{2 \cdot N \cdot l} \quad (9)$$

FIGS. 12 and 13 show the value of the inclination angle $\theta$ calculated in accordance with the above equation (9).

As clearly illustrated from FIGS. 12 and 13, the inclination angle $\theta$ becomes an extremely small value such as 1.286° in the embodiment shown in FIG. 6 and 0.643° in the embodiment illustrated in FIG. 8. Actually, it is very difficult to adjust the inclination angle $\theta$ to such an extremely small value, so that it is necessary to effect a troublesome adjustment. In addition, if an accurate adjusting mechanism is arranged one by one for each displacing amount detecting apparatus, the apparatus becomes expensive.

Next, the explanation will be made to the method for manufacturing the displacing amount detecting apparatus in which the substrate can be inclined by a desired small angle in an easy and fast manner with respect to the magnetization pattern and further it is not necessary to arrange the expensive adjusting mechanism for each displacing amount detecting apparatus.

Figure 14:
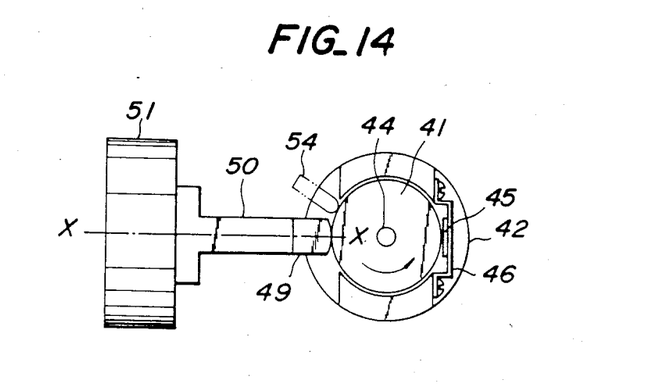
FIG. 14 is a plan view for explaining a method for manufacturing the displacing amount detecting apparatus according to the invention.
Figure 15:
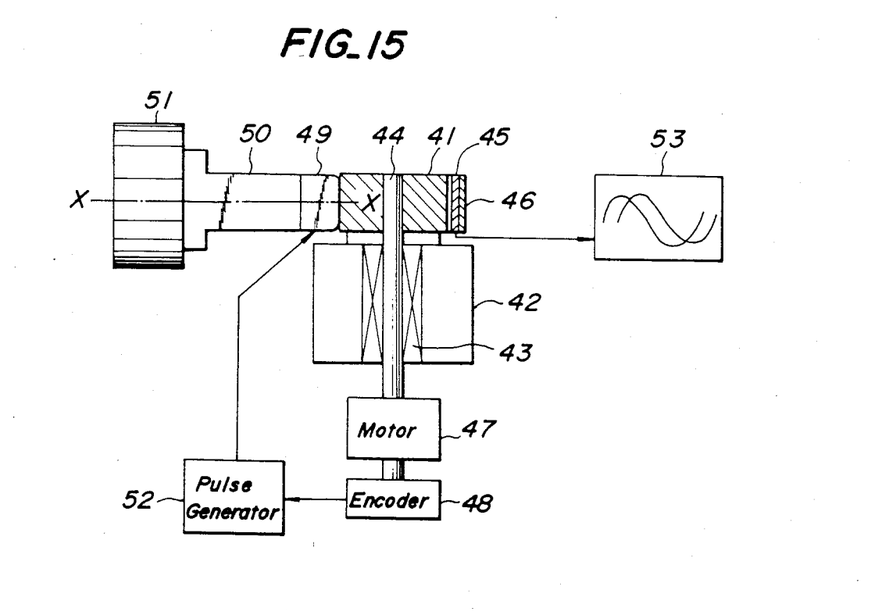
FIG. 15 is a schematic cross sectional view for explaining the manufacturing method shown in FIG. 14.

FIGS. 14 and 15 are plan and cross sectional views showing one embodiment of the device for carrying out the method of manufacturing the displacing amount detecting apparatus according to the invention in which use is made of a magnetic drum as a magnetic record medium, and a rotating direction and a rotation amount of the magnetic drum are to be detected. In the present embodiment, a magnetic drum 41 is secured to a shaft 44 which is rotatably supported by a supporting member 42 having substantially a cylindrical shape via a bearing 43. A common substrate 45 on which magnetic detectors are arranged is secured to the supporting member 42 through a supporting plate 46. In FIGS. 14 and 15, the magnetic detectors are not shown, but actually these detectors are arranged on the common substrate 45 in parallel with the plane of the drawing of FIG. 15. Moreover, the common substrate 45 is secured to the supporting plate 46 and the supporting plate 46 is fixed to the supporting member 42 by means of screws. Since the common substrate 45 is secured to the supporting member 42, the common substrate 45 is fixedly arranged with respect to the magnetic drum 41. The shaft 44 is connected to a motor 47, and a rotary encoder 48 is connected to the motor 47.

Further, a magnetic head 49 for recording the magnetization pattern on the drum 41 is arranged rotatably with respect to the magnetic drum 41. The recording magnetic head 49 is connected to a rotation stage 51 through an arm 50 so as to be rotated about an axis x—x. An output of the rotary encoder 48 is supplied to a pulse generator 52 so as to generate pulses which are synchronized completely with a rotation of the shaft 44 i.e. the magnetic drum 41. The thus generated pulses are supplied to the magnetic head 49 so as to record the magnetization pattern on the magnetic drum 41. In this case, the encoder 48 and the pulse generator 52 are suitably adjusted so as to record a thousand pulses equidistantly on a circumference surface of the magnetic drum 41.

Figure 16A:
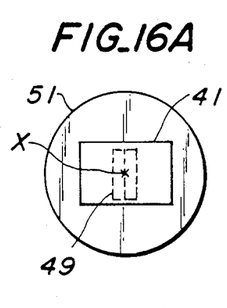
FIGS. 16A, 16B, 17A and 17B are schematic views for explaining the manufacturing method shown in FIG. 14.
Figure 16B:
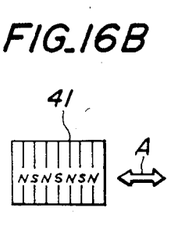
Figure 17A:
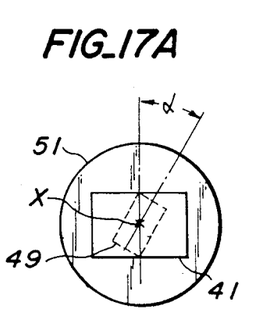
Figure 17B:
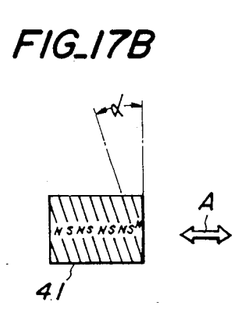

Now, if it is assumed that a gap of the magnetic head 49 is arranged in parallel with the shaft 44 as shown in FIG. 16A, the magnetization pattern is recorded on the circumference surface of the magnetic drum 41 in a direction perpendicular to the displacing direction A as shown in FIG. 16B. Further, if the rotation stage 51 is rotated by an angle $\alpha$, the gap of the magnetic head 49 is inclined by the angle $\alpha$ with respect to the shaft 44 as shown in FIG. 17A. In this case, the magnetization pattern which is inclined by the angle $\alpha$ with respect to the direction perpendicular to the displacing direction A as shown in FIG. 17B. Therefore, if output signals generated from two magnetic detectors arranged on the common substrate 45 are displayed on a monitor 53 as shown in FIG. 15 and the magnetization pattern is recorded on the magnetic drum 41 by rotating the rotation stage 51 so as to make the phase difference $\phi$ between two output signals to a desired value, the magnetization pattern can be inclined by a desired angle $\theta$ with respect to the common substrate 45. In this case, it is possible to record new magnetization pattern on the previously recorded magnetization pattern by means of the magnetic head 49, but it is preferable to erase the previously recorded magnetization pattern by means of an erasing magnetic head 54 as shown by a dot and dash line in FIG. 14 or by using the magnetic head 54 49 as the erasing head before recording the magnetization pattern.

According to the manufacturing method mentioned above, since the common substrate 45 on which the magnetic detectors are provided is fixedly arranged with respect to the magnetic drum 41 and the magnetic head 49 for recording the magnetization pattern is inclined with respect to the magnetic drum 41, it is possible to incline the magnetization pattern by a predetermined small angle in an easy and rapid manner with respect to the common substrate. Moreover, since the rotation stage 51 for rotatably supporting the magnetic head 49 can be commonly used for a number of the displacing amount detecting apparatuses, the magnetization patterning can be performed in an inexpensive manner. In the embodiment shown in FIG. 15, the rotation stage 51 is manually rotated by watching the waveforms of the two output signals displayed on the monitor 53, but it is possible to provide a servo loop for automatically rotating the rotation stage 51 in such a manner that the phase difference between the two output signals is made to a desired value.

The present invention is not limited to the embodiments mentioned above, but various modifications are possible. For example, in the embodiments mentioned above, the magnetic biasing is effected by utilizing the secondary mutual biasing effect, but it is also possible to use the primary mutual biasing effect. In addition, it is not always necessary to utilize the mutual biasing effect. In this case, it is possible to arrange a conductive film for each magnetic detectors and to flow a current through the conductive film so as to generate the biasing magnetic field. Moreover, the magnetoresistive elements are arranged in such a manner that a film surface of the magnetoresistive element becomes vertical with respect to the recording medium on which the magnetization pattern is recorded, but it is possible to arrange the film surface in parallel with the recording medium. Furthermore, in the embodiments mentioned above, it is also possible to reverse the polarity of the voltage source.

What is claimed is:

1. An apparatus for detecting a relative displacement of a magnetic record medium on which a magnetization pattern is recorded along a displacing direction, said pattern being in the form of a plurality of successive magnetized areas, each area extending in a first direction, said apparatus comprising
   a common substrate having a flat surface which is arranged such that it is inclined by an angle with respect to said first direction of said areas of said magnetization pattern;
   at least two magnetic detectors arranged on said flat surface at positions which are shifted in said first direction, each of said magnetic detectors comprising at least two magnetoresistive elements and at least one insulating layer arranged between the magnetoresistive elements;
   means for magnetically biasing said at least two magnetoresistive elements of each magnetic detector in opposite directions;
   means for connecting said at least two magnetoresistive elements of each of said detectors into at least one bridge circuit having first and second input terminals and first and second output terminals, said first and second input terminals being connectable to an electric power source; and
   at least one differential amplifier having first and second input terminals connected to said first and second output terminals of said at least one bridge circuit;
   the angle by which said flat surface is inclined with respect to said first direction being set such that output signals appearing at said first and second output terminals of the bridge circuit have a phase difference of about 180° with respect to a pitch of the magnetization pattern.

2. An apparatus according to claim 1, wherein said substrate on which at least two magnetic detectors are provided is arranged in a second direction perpendicular to the displacing direction and the first direction of said areas of said magnetization pattern is inclined with respect to the second direction perpendicular to the displacing direction.

3. An apparatus according to claim 1, wherein said common substrate on which at least two magnetic detectors are provided is inclined with respect to a second direction perpendicular to the displacing direction and the first direction of said areas of said magnetization pattern is arranged in said direction perpendicular to the displacing direction.

4. An apparatus according to claim 1, wherein there are provided first and second magnetic detectors respectively having first and second and third and fourth magnetoresistive elements which are so arranged on said common substrate that a phase difference betwen output signals generated from said first and second magnetic detectors is substantially 180°.

5. An apparatus according to claim 4, wherein said first and third and second and fourth magnetoresistive elements are respectively connected in series with each other between positive and negative terminals of a voltage source, and a junction point between said first and third magnetoresistive elements and a junction point between said second and fourth magnetoresistive elements are respectivelly connected to positive and negative inputs of a differential amplifier to generate the output signal.

6. An apparatus according to claim 4, wherein said first and second and third and fourth magnetoresistive elements are respectively connected in series with each other between positive and negative terminals of a voltage source, and a junction point between said first and second magnetoresistive elements and a junction point between said third and fourth magnetoresistive elements are respectively connected to positive and negative inputs of a differential amplifier to generate the output signal.

7. An apparatus according to claim 1, wherein there are provided first, second, third and fourth magnetic detectors respectively having first and second; third and fourth; fifth and sixth; and seventh and eighth magnetoresistive elements which are so arranged on said common substrate that a phase difference between output signals generated from said first and third magnetic detectors and a phase difference between output signals generated from said second and fourth magnetic detectors are substantially 180°.

8. An apparatus according to claim 7, wherein said first and second; third and fourth; fifth and sixth; and seventh and eighth magnetoresistive elements are respectively connected in series with each other between positive and negative terminals of a voltage source, a junction point between said first and second magnetoresistive elements and a junction point between said fifth and sixth magnetoresistive elements are respectively connected to positive and negative inputs of a first differential amplifier to generate a first detection output signal, and a junction point between said third and fourth magnetoresistive elements and a junction point between said seventh and eighth magnetoresistive elements are respectively connected to positive and negative inputs of a second differential amplifier to generate a second detection output signal, a phase difference between these first and second detection output signals being substantially 90°.

* * * * *